United States Patent [19]

Kutnyak

[11] 4,328,392

[45] May 4, 1982

[54] WELDED-TURN HELICAL ELECTRICAL CONDUIT WITH ELECTRICALLY CONDUCTIVE GROUNDING ELEMENT

[75] Inventor: Thomas A. Kutnyak, Greenwood, S.C.

[73] Assignee: Automation Industries, Inc., Greenwich, Conn.

[21] Appl. No.: 150,213

[22] Filed: May 15, 1980

[51] Int. Cl.³ .................... H02G 3/04; F16L 11/10; F16L 11/12
[52] U.S. Cl. .................... 174/68 C; 138/131; 138/139; 174/47; 174/65 R; 174/78

[58] Field of Search ............. 174/47, 65 R, 65 SS, 174/68 C, 78, 108, 109; 138/109, 122, 129, 131, 132, 133, 134, 139; 156/143, 144

[56] References Cited

U.S. PATENT DOCUMENTS 3,006,664 10/1961 Appleton et al. ............... 174/78 X
3,239,400 3/1966 Anselm ........................ 156/143 X Primary Examiner—Laramie E. Askin
Attorney, Agent, or Firm—Francis N. Carten

[57] ABSTRACT

An electrical conduit formed of helically fabricated grounding and reinforcing elements, including a foil channel having overlapped turns welded to one another and to a supporting helix.

14 Claims, 3 Drawing Figures

WELDED-TURN HELICAL ELECTRICAL CONDUIT WITH ELECTRICALLY CONDUCTIVE GROUNDING ELEMENT

BACKGROUND OF THE INVENTION

Electrical conduits of the general type contemplated by the invention are flexible armored electrically grounded housing for containing insulated conductors. They are connected by suitable end fittings to electrical inlet or outlet boxes and the conductors are drawn through the conduits during installation. The most common form of conduit previously in use is a roll-formed metal channel having interlocking turns, with a cotton cord between the turns for dampening noise and copper wire wrapped about the channel to provide an electrical ground. The construction is heavy, rather expensive and of limited flexibility. The gaps between the turns of the channel are not welded and electrical conductivity during grounding is not always reliable. Rather complex threaded end fitting designs are necessary to insure connection with the end portions of such conduits.

Other electrical conduit designs are known consisting of plastic flexible tubes reinforced with wire or a plastic helix, but those are for use only in light service applications.

It is the principal object of the present invention to provide a heavy duty electrical conduit of composite or matrix construction which is an improvement over the armored conduit designs of the prior art described above.

SUMMARY OF THE INVENTION

The invention provides an electrical conduit comprising a self-supporting helix and a foil channel applied helically about the helix and spanning the turns thereof. The edge portions of the channel are overlapped over the turns of the helix. Connecting means are provided affixing the overlapped edge portions of the channel to one another and to the helix. An electrically conductive extended grounding element is applied along the central portion of the channel and an outer circumferentially complete jacket surrounds all of the foregoing elements.

The helix is preferably a round metal wire. In one variation of the invention the central portion of the channel is flat and in another it is convoluted outwardly. The connecting means preferably is a weld between the overlapped channel edge portions and between one of the edge portions and the helix.

The weld between the edge portion and helix provides longitudinal tensile strength to the conduit and improved electrical conductivity for grounding purposes. The interior helix provides axial compressive strength so that the composite conduit meets normal crush resistant requirements. Because of the lightness of the foil channel, the assembly is low in weight and cost, conforms readily to a screw connection with an end fitting, and is exceptionally flexible.

DESCRIPTION OF PREFERRED EMBODIMENT

Each of the forms of electrical conduit described herein are especially suited for fabrication on continuously advancing mandrels as described in U.S. Pat. No. 3,155,559. Such apparatus allows each of the helically disposed elements to be applied in turn together with the outer jacket in a continuous fashion so that the composite conduit emerges from the end of the mandrel in continuous lengths.

Figure 1:
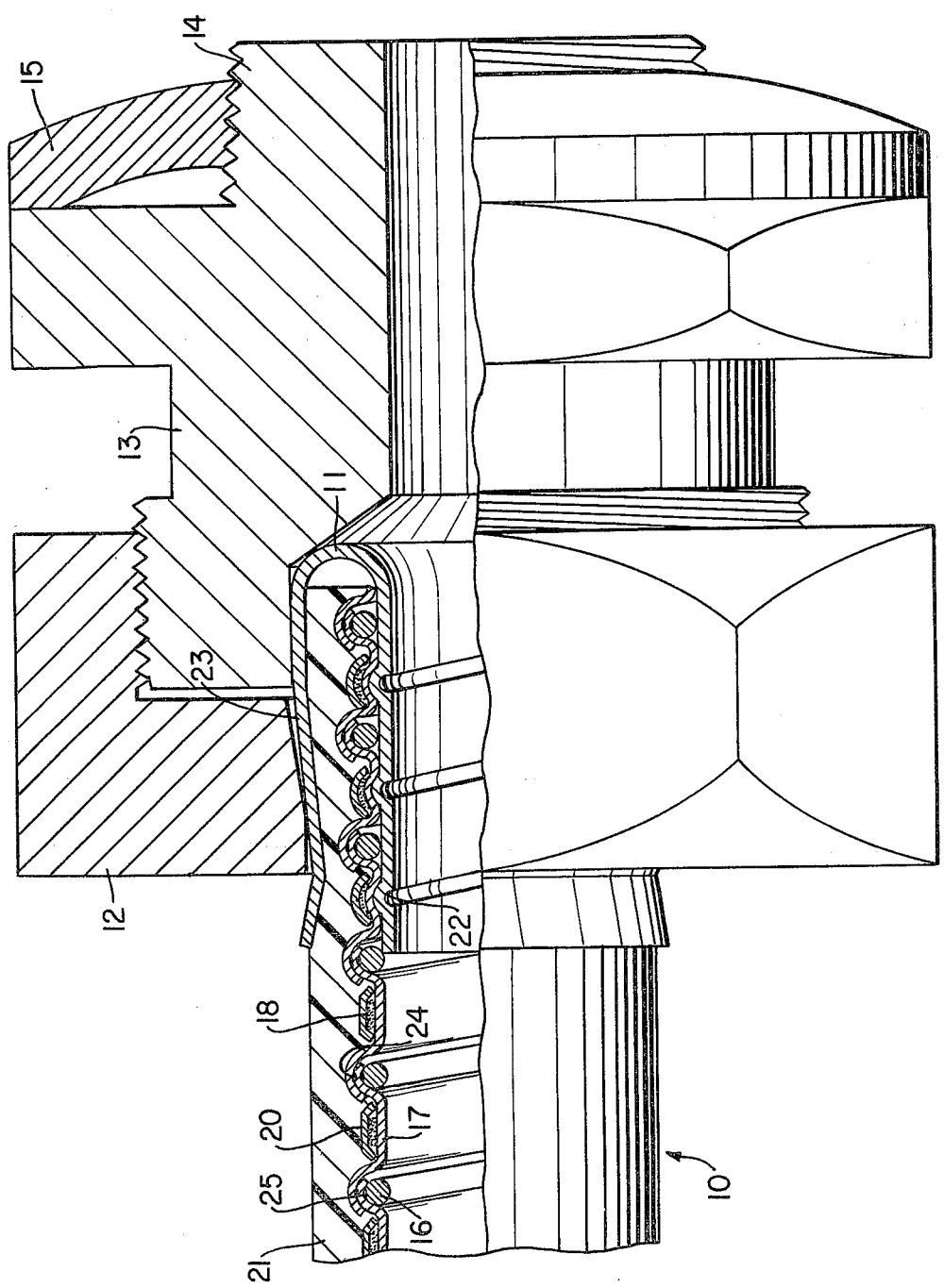
FIG. 1 is a side view, half in section, of one form of the electrical conduit of the invention assembled with an end fitting.
Figure 2:
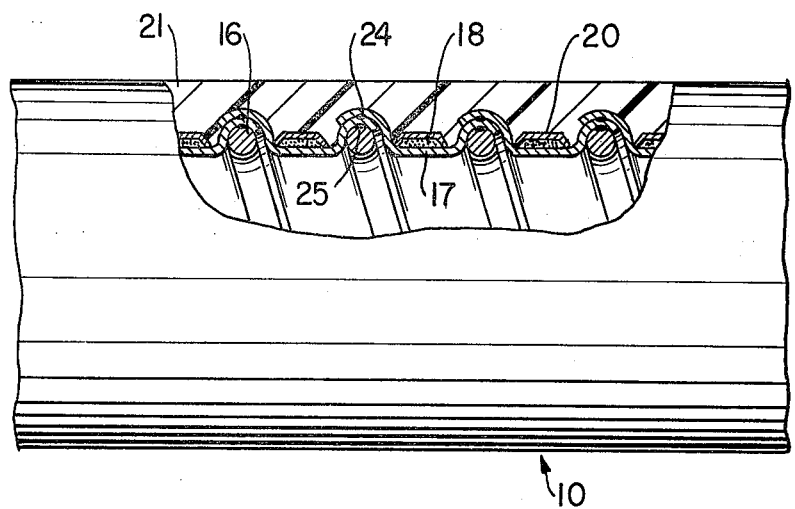
FIG. 2 is an enlarged fragmentary side view partly in section showing the wall construction of the conduit of FIG. 1.
Figure 3:
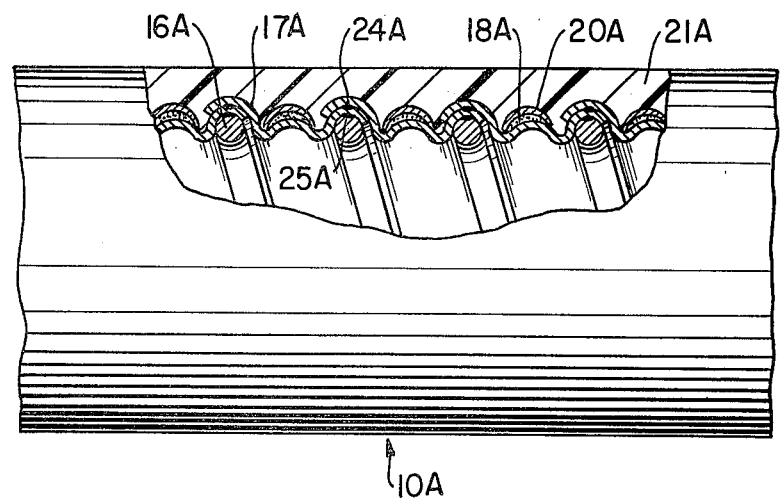
FIG. 3 is an enlarged fragmentary side view partly in section of another embodiment of the conduit of the invention.

Referring first to FIG. 1 a conduit 10 made in accordance with the invention is attached at its end portion to a cylindrical metal insert 11, the form and function of which are described hereafter. A more detailed view of the particular construction of the conduit 10 is shown in FIG. 2 and an alternate embodiment is illustrated in FIG. 3, all described more completely below. The insert 11 is held between a compression nut 12 and a reducing adaptor 13 which are threaded together. On a threaded end 14 of the adaptor 13 a locking nut 15 is screwed in place to hold the entire end fitting to the wall of an electrical inlet or outlet box (not shown).

In both FIGS. 1 and 2 the form of conduit includes first a self-supporting round wire helix 16 of steel with a high carbon content, aluminum clad steel, copperized steel or galvanized steel. A high carbon content provides good electrical properties. The turns of the helix 16 are spaced apart many times the wire diameter.

Wrapped helically about the helix 16 is a preformed, rolled, soft annealed aluminum or zinc foil channel 17 approximately 0.006 inch thick. The edge portions of the channel 17 are configured with overlapping rounded upstanding lips one of which conforms to the shape of the wire helix 16 and the other conforms to the shape of the first. Together the turns of the wire helix 16 and channel 17 define the bore of the conduit, and it is particularly smooth and free of ridges which otherwise could cause snagging or abrasion of an electrical conductor pulled through it.

In the form of conduit shown in FIGS. 1 and 2 an electrically conductive extended grounding element in the form of a high carbon fiber grounding strip 18 is applied helically along the center of the channel 17. A 90% pure carbon fiber is especially satisfactory for providing a continuous ground between the channel and the outer elements of the conduit.

Applied about the strip 18 is a helical tape 20 which overlies the central portion of the channel 17 and the grounding strip 18. The tape 20 serves to enclose the carbon grounding strip 18 so that no loose carbon particles escape. The tape may advantageously be aluminum foil tape 0.002 to 0.004 inch thick with pressure sensitive adhesive on one or both of its sides.

A polyvinyl chloride jacket 21 is extruded about all of the foregoing elements to seal the assembly from water penetration. It may be from 0.035 to 0.065 inch thick and to meet code requirements it is fire retardant.

Referring again to FIG. 1 the insert 11 of the end fitting is formed with a helical exterior land 22 of a pitch equal to that of the wire helix 16. The diameter of the insert 11 is such that it can be forcibly screwed into the end portion of the conduit 10 so that the helical land 22 deforms the central portion of the channel 17 outwardly. The insert further includes a turned back sleeve portion 23 which surrounds the exterior of the jacket 21 end portion in sealing engagement therewith.

In order to provide longitudinal tensile strength to the assembly the overlapping portions of the channel 17 are welded continuously together by an ultrasonic weld 24. Also the inner edge portion is welded to the wire helix 16 by a second ultrasonic weld 25. The welds also improve the electrical grounding ability of the assembly and they seal the conduit internally.

Turning now to the embodiment of FIG. 3, a wire helix 16A, strip 18A, tape 20A, and outer jacket 21A are as in the previous embodiment. A foil channel 17A is also provided with a continuous ultrasonic weld 24A between the overlapping edge portions and a similar weld 25A between the inner edge portion and the wire helix 16A. In this form of the invention, however, the central portion of the channel 17A is formed with an outward convolution as shown. While the bore of the conduit is somewhat less smooth as a result of this convolution it increases the flexibility of the conduit because the foil channel folds more uniformly between the turns of the helix 16A.

The advantages of the present invention, as well as certain changes and modifications to the disclosed embodiments thereof, will be readily apparent to those skilled in the art. It is the applicant's intention to cover all those changes and modifications which could be made to the embodiments of the invention herein chosen for the purposes of the disclosure without departing from the spirit and scope of the invention.

I claim:

1. An electrical conduit comprising:
    (a) a self-supporting metal wire helix;
    (b) a metal foil channel applied helically about the helix and spanning the turns thereof, the edge portions of the channel being overlapped over the turns of the helix;
    (c) weld means affixing the overlapped edge portions of the channel to one another and to the helix;
    (d) an electrically conductive extended grounding element applied along the central portion of the channel; and
    (e) an outer circumferentially complete jacket.

2. An electrical conduit according to claim 1 wherein the helix is a round wire.

3. An electrical conduit according to claim 1 wherein the central portion of the channel is flat.

4. An electrical conduit according to claim 1 wherein the central portion of the channel is convoluted outwardly.

5. An electrical conduit according to claim 1 wherein the electrically conductive grounding element is a high carbon fiber strip.

6. An electrical conduit according to claim 5 wherein a tape is applied over the grounding strip and inside the jacket.

7. An electrical conduit according to claim 6 wherein the tape is of metal foil.

8. An electrical conduit according to claim 7 wherein the metal foil tape has pressure sensitive adhesive on at least one side thereof.

9. An electrical conduit comprising
    (a) a self-supporting metal round wire helix having spaced turns;
    (b) a pre-formed metal foil channel applied helically about the wire helix and spanning the turns thereof the edge portions of the channel being overlapped over the turns of the wire helix;
    (c) weld means affixing the overlapped edge portions of the channel to one another and to the wire helix;
    (d) an electrically conductive extended grounding element applied along the central portion of the channel; and
    (e) an outer circumferentially complete extruded plastic jacket.

10. An electrical conduit according to claim 9 wherein the central portion of the channel is flat.

11. An electrical conduit according to claim 9 wherein the central portion of the channel is convoluted outwardly.

12. An electrical conduit according to claim 9 wherein the grounding element is a high carbon fiber strip and a metal foil tape with pressure sensitive adhesive on at least one side thereof is applied about the strip.

13. An electrical conduit according to claim 9 wherein the channel is of aluminum.

14. A electrical conduit according to claim 9 wherein the outer jacket is of polyvinyl chloride.

* * * * *